(12) United States Patent
Tseitlin et al.

(10) Patent No.: US 7,634,251 B2
(45) Date of Patent: Dec. 15, 2009

(54) METHOD AND SYSTEM FOR GENERATING PEER TO PEER BILLING RECORDS WHEN ONE OR MORE CLIENTS PAY FOR THE OTHER CLIENTS

(75) Inventors: Eugene R. Tseitlin, Northbrook, IL (US); Leopold A. Alonso, Barrington, IL (US); Barry M. Kogan, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 687 days.

(21) Appl. No.: 11/425,161

(22) Filed: Jun. 20, 2006

(65) Prior Publication Data

US 2007/0291915 A1 Dec. 20, 2007

(51) Int. Cl.
*H04M 11/00* (2006.01)
(52) U.S. Cl. .............. 455/406; 455/410; 455/412.2; 705/40; 705/41
(58) Field of Classification Search ......... 455/406–408, 455/410–411, 412.1–2; 705/40, 41
See application file for complete search history.

(56) References Cited

U.S. PATENT DOCUMENTS

| | | | |
|---|---|---|---|
| 5,745,884 A | 4/1998 | Carnegie et al. | |
| 6,789,189 B2 * | 9/2004 | Wheeler et al. | 713/156 |
| 7,210,620 B2 * | 5/2007 | Jones | 235/380 |
| 7,275,685 B2 * | 10/2007 | Gray et al. | 235/380 |
| 7,319,855 B1 * | 1/2008 | Brune et al. | 455/406 |
| 2002/0029197 A1 | 3/2002 | Kailamaki et al. | |
| 2002/0068545 A1 | 6/2002 | Oyama et al. | |
| 2002/0128001 A1 | 9/2002 | Shuttleworth | |
| 2003/0051041 A1 | 3/2003 | Kalavade et al. | |
| 2005/0114367 A1 | 5/2005 | Serebrennikov | |
| 2005/0278192 A1 * | 12/2005 | Cantini et al. | 705/1 |
| 2007/0027803 A1 * | 2/2007 | Brandes et al. | 705/39 |

FOREIGN PATENT DOCUMENTS

WO 0191003 A2 11/2001
WO 0221865 A1 3/2002

* cited by examiner

*Primary Examiner*—CongVan Tran

(57) ABSTRACT

A method and a system for generating peer-to-peer billing records for at least one peer-to-peer communication session corresponding to at least one communication service in a communication system. The method comprises the steps of: collecting a completion-billing-token corresponding to a peer-to-peer communication session corresponding to a communication service and evaluating the completion-billing-token along with a paid-authentication-token corresponding to the peer-to-peer communication session. The completion-billing-token comprises a details corresponding to the peer-to-peer communication session, the details being at least one of a signature and an agreement. The paid-authentication-token controls duration of a peer-to-peer communication session based on a communication service provider.

10 Claims, 5 Drawing Sheets

METHOD AND SYSTEM FOR GENERATING PEER TO PEER BILLING RECORDS WHEN ONE OR MORE CLIENTS PAY FOR THE OTHER CLIENTS

FIELD OF THE INVENTION

The present invention relates generally to a communication system. More specifically, the present invention relates to a communication system for generating peer-to-peer billing records when one or more clients pay for the other clients.

BACKGROUND OF THE INVENTION

Peer-to-peer billing methods are known in the art that enable one or more wireless clients to pay for a communication service used by one or more free wireless clients. However, there are several limitations while calculating the exact bill for each session utilized by each of the wireless clients. In the existing peer-to-peer billing methods there is no service interaction between a plurality of wireless clients participating in the communication service through a call processing server. Therefore, factors such as a change of wireless network and a change of tariff or quality of service for each wireless client are not considered while calculating the bill. Only service information of the wireless client who has agreed to pay is considered while calculating the bill.

Further, in the existing peer-to-peer billing methods, information about simultaneous multiple services that a wireless client might be involved in during the session, is difficult to collect. If during the session, a wireless client seamlessly roams through multiple wireless networks, the service charges might vary as per the particular wireless network that is being used. Therefore, it becomes difficult to estimate the exact bill for the wireless client for the session or choose an optimum quality of service, for example, the wireless client cannot choose a slower service with a lower cost.

Additionally, in the existing peer-to-peer billing methods, if a wireless client uses a pre-paid billing, the session cannot be extended beyond a specified pre-paid amount. And again in pre-paid billing, it is difficult to calculate the charge for multiple sessions that are accessed simultaneously.

Moreover, in conventional peer-to-peer billing methods, a bill for a communication service is calculated at a coprocessor in the network. For this purpose, the coprocessor collects all the information corresponding to a session to be billed. Therefore, all the wireless clients are required to communicate with the coprocessor via their respective access points, for the coprocessor to generate the bill. Thus, even if two wireless clients that are involved in a session are associated with a same access point, the two wireless clients have to communicate with the coprocessor to generate a bill for the session.

Therefore, there is a need for a method and a system that provides accurate peer-to-peer billing for the session by dynamically calculating the bill depending on various factors, such as the additional services that are simultaneously used by each wireless clients during a session, wireless clients roaming between different wireless networks, and a desired quality of service. Also, there is a need for a method and a system that can obviate a need of a coprocessor while calculating a peer-to-peer bill.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE INVENTION

Figure 1:
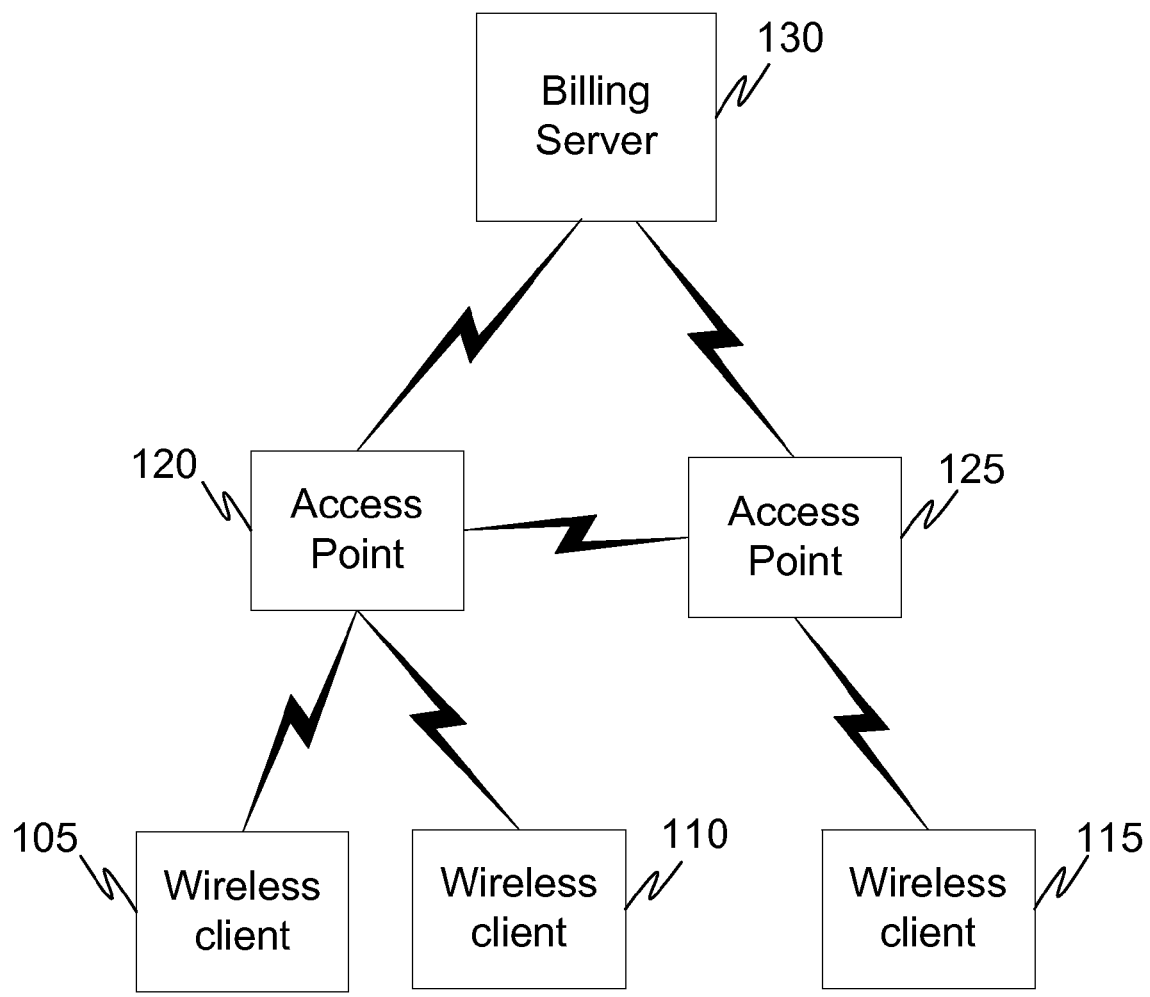
FIG. 1 illustrates a block diagram of an exemplary embodiment depicting direct peer-to-peer communicating wireless clients in accordance with an embodiment of the present invention.

Before describing in detail embodiments that are in accordance with the present invention, it should be observed that the embodiments reside primarily in combinations of method steps and apparatus components related to a generating peer-to-peer billing records. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

It will be appreciated that embodiments of the invention described herein may be comprised of one or more conventional processors and unique stored program instructions that control the one or more processors to implement, in conjunction with certain non-processor circuits, some, most, or all of the functions of the method and apparatus for generating peer-to-peer billing records. The non-processor circuits may include, but are not limited to, a radio receiver, a radio transmitter, signal drivers, clock circuits, power source circuits, and user input devices. As such, these functions may be interpreted as steps of a method for generating peer-to-peer billing records. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to various embodiments, the present invention proposes a method and a billing system for direct peer-to-peer communicating wireless clients that allows at least one wireless client to pay for at least one communication service utilized by the other wireless clients involved in a peer-to-peer communication session. Specifically, the present invention obviates a need for a call processing server to collect information about the peer-to-peer communication session in order to calculate a bill for the peer-to-peer communication session. It will be appreciated by those with ordinary skill in the art that the method and the billing system described herein are not just applicable to wireless clients such as mobile phones or laptops, but are also applicable to wired clients such as home phones or personal computers.

Turning now to FIG. 1, a block diagram of an exemplary embodiment depicting direct peer-to-peer communicating wireless clients is shown in accordance with an embodiment of the present invention. In a peer-to-peer communication session, a wireless client 105 may wish to communicate with a wireless client 110 and a wireless client 115 using a communication service, such as tele-conferencing. Those skilled in the art will realize that any number of wireless clients can participate in the peer-to-peer communication session. However, for exemplary purposes, only three wireless clients, namely the wireless client 105, the wireless client 110 and the wireless client 115, are depicted in FIG. 1. Also, the wireless clients subscribed to different service providers and in different coverage areas are well within the scope of the present invention. In the present embodiment, the wireless client 105 and the wireless client 110 are associated with an access point 120. Thus, the wireless client 105 and the wireless client 110 can be in the same coverage area. The wireless client 115, on the other hand is associated with an access point 125.

The wireless client 105, the wireless client 110 and the wireless client 115 can be for example, a personal digital assistant, a mobile phone or a laptop. Moreover, the present invention is also applicable to wired clients such as home phones and personal computers. The communication service can be for example, a teleconferencing, a video-conferencing or a text-conferencing between the directly communicating peer-to-peer the wireless client 105, the wireless client 110 and the wireless client 115. The wireless client 105 may wish to be billed for a peer-to-peer communication session when the wireless client 105, the wireless client 110 and the wireless client 115 are involved in a peer-to-peer communication session using the communication service. To initiate the peer-to-peer communication session, the wireless client 105 can send an "I Pay For You" (IP4U) message to the wireless client 110 and the wireless client 115. An IP4U message implies that the wireless client 105 agrees to pay for the communication service used in the peer-to-peer communication session. Those skilled in the art will realize that the wireless client 105 can send the IP4U message to the access point 120. The access point 120 can forward the IP4U message to the wireless client 110 and to the access point 125. The access point 125 can forward the IP4U to the wireless client 115. In an embodiment of the invention more than one wireless client, say the wireless client 105 and the wireless client 110, may agree to pay for the communication service when in a peer-to-peer communication session with a third wireless client, say the wireless client 115. In this embodiment, the wireless client 105 and wireless client 110 can send an IP4U message to wireless client 115. However, for exemplary purposes only one wireless client, the wireless client 105, is considered to be a pay wireless client in the embodiment and rest of the wireless clients, the wireless client 110 and the wireless client 115, are considered to be the free wireless clients. A pay wireless client is a wireless client who agrees to pay for the communication services utilized by the other wireless clients. The other wireless clients, who the pay wireless client pays for, are referred to as the free wireless clients.

Further, the present invention proposes a billing server (BS) 130 that registers the wireless client 105, the wireless client 110 and the wireless client 115. Registration with the BS 130 ensures that the wireless clients are authenticated. The BS 130 coordinates the billing process for the peer-to-peer communication session between the wireless client 105, the wireless client 110 and the wireless client 115 using the communication service. The BS 130 can be in communication with the wireless client 105, the wireless client 110 and the wireless client 115. Those skilled in the art will appreciate that the wireless client 105 and the wireless client 110 can communicate with the BS 130 through the access point 120 and the wireless client 115 can communicate with the BS 130 through the access point 125. The BS 130 can inform the wireless clients about the communication services that can be used by the wireless clients in the peer-to-peer communication session and the BS 130 can send a token to each of the wireless client that are registered. A token corresponding to a communication service comprises details of the communication service and a predefined criterion for each pay wireless client to pay for the communication service utilization by each free wireless client. Details of the token are described in FIG. 2. Moreover, the token can also have an IP4U option. The wireless clients can then selects a desired communication service. The BS 130 can enable IP4U feature for each communication service for each wireless client, based on the wireless client's subscribed communication services and the wireless client's previous billing status. The wireless clients can then initiate a peer-to-peer communication session with the subscribed communication service.

While the peer-to-peer communication session is active, each wireless client participating in the peer-to-peer communication session can simultaneously evaluate the cost of the peer-to-peer communication session and charges pertaining to other communication services such as music file download, used during the peer-to-peer communication session at runtime. At the end of each peer-to-peer communication session, each wireless client forwards the peer-to-peer communication session details to the BS 130. Based on the peer-to-peer communication session details, the BS 130 can calculate an accurate bill for the peer-to-peer communication session of the communication service and can send the accurate bill to the wireless client 105, who had initially agreed to pay for the communication service and to a communication service provider for the communication service.

Those skilled in the art will realize that the wireless client 105 may initiate a peer-to-peer communication session or the wireless client 105 may be invited to the peer-to-peer communication session. The wireless client 105 can send an invite to the wireless client 110 and the wireless client 115 for the peer-to-peer communication session corresponding to a communication service. This invite can be sent via the access point 120 and the access point 125. The wireless client 105 can send a signature including a guarantee of payment for a full use of the communication service for the peer-to-peer communication session. Alternately, the wireless client 105 may ask one of the wireless clients, for instance the wireless client 110, to pay for the peer-to-peer communication session. The wireless client 110 and the wireless client 115 can analyze the invite and based on a prior authentication of the invite from the BS 130, the wireless client 110 and wireless client 115 can send a confirmation to the wireless client 105. The confirmation can be either to participate as free wireless clients or to pay for the peer-to-peer communication session for wireless client 105. At the end of the peer-to-peer communication session, each wireless client sends a completion-billing-token corresponding to the peer-to-peer communication session to the BS 130. A completion-billing-token can comprise a signature or an agreement between the wireless client 105, the wireless client 110 and the wireless client 115 participating in the peer-to-peer communication session and the session details. Further, each wireless client has a unique signature that can comprise the details to be considered during the peer-to-peer communication session.

To calculate the accurate bill, the BS 130 collects a completion-billing-token from each wireless client, namely the wireless client 105, the wireless client 110 and the wireless client 115, and calculates the accurate bill and sends it to the wireless client 105. In the case when a completion-billing-token from at least one of the wireless clients is lost, the BS 130 can still calculate an accurate bill based on the existing completion-billing-tokens from other wireless clients participating in the peer-to-peer communication session. A completion-billing-token comprises a signature corresponding to a wireless client involved in the peer-to-peer communication session and the session details. The session details comprise information about the peer-to-peer communication session. The information about the peer-to-peer communication session can be for example, duration of time that the peer-to-peer communication session lasted for, a wireless network used by each wireless client for the peer-to-peer communication session, the tariff of the wireless network and roaming information corresponding to each wireless client involved in the peer-to-peer communication session. Those skilled in the art will realize that the bill may vary depending on, for instance, tariff charged by the wireless client's wireless network, roaming charges in case the wireless client roams out of a home coverage area of the wireless network and the number of communication services used by the wireless client.

In an embodiment of the present invention, prepaid billing can be employed for the communication service. For instance, the wireless client 105 can subscribe for one or more communication services with a predefined amount negotiated between the wireless clients. Particulars of each active peer-to-peer communication session corresponding to each communication service are controlled based on the evaluation of each peer-to-peer communication session details and the signatures corresponding to each wireless client. The particulars can be for example, the duration of a peer-to-peer communication session or the quality of service of the peer-to-peer communication session. The duration for which a peer-to-peer communication session corresponding to a communication service remains active for the wireless client 105, the wireless client 110 and the wireless client 115 can depend on various factors such as the tariff charged by a wireless client's wireless network, roaming charges in case a wireless client roams out of a home coverage area of a wireless network and the number of communication services used by a wireless client. The wireless client 105 can be notified if the predefined amount that was mutually agreed upon by the wireless clients is about to exhaust while using the communication service. In an embodiment of the present invention, any of other wireless clients participating in the peer-to-peer communication session can request the pay wireless client to extend a payment limit without communication service interruption, based on a mutual agreement between each wireless client participating in the peer-to-peer communication session.

Figure 2:
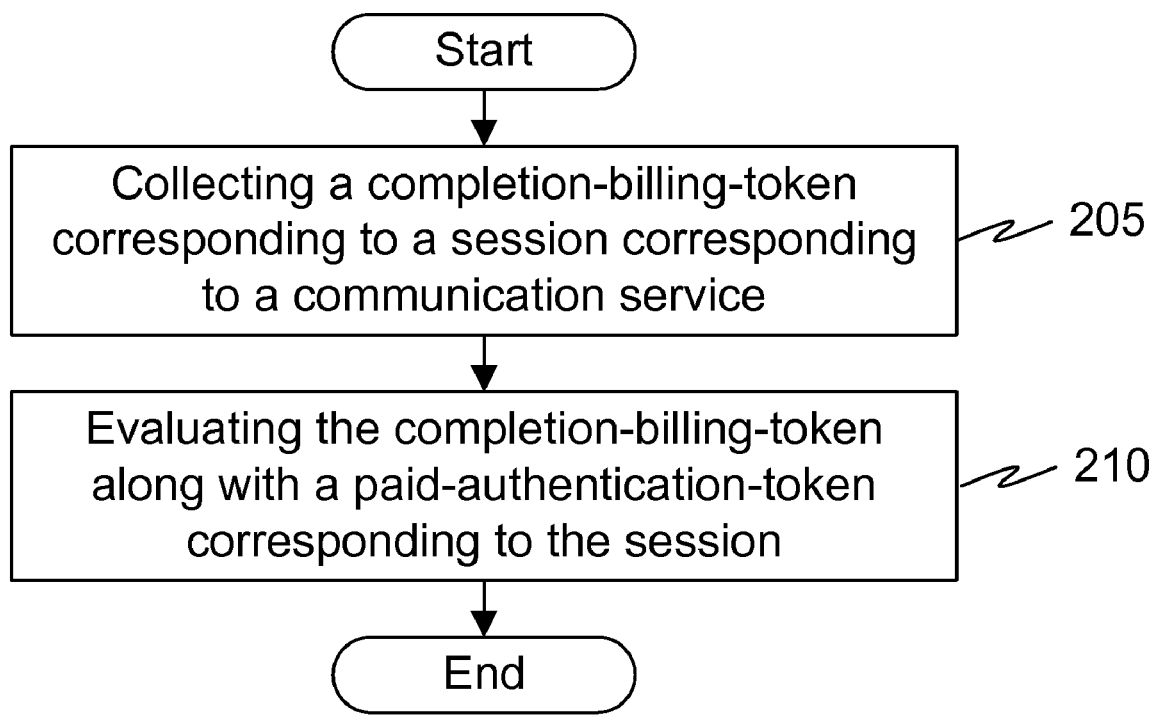
FIG. 2 illustrates a flow diagram of a method for generating peer-to-peer billing records for at least one peer-to-peer communication session corresponding to at least one communication service in a communication system in accordance with an embodiment of the present invention.

Turning now to FIG. 2, a flow diagram of a method for generating peer-to-peer billing records for at least one peer-to-peer communication session corresponding to at least one communication service in a communication system is shown in accordance with an embodiment of the present invention. A plurality of wireless clients can be in communication with each other using the communication service. The plurality of wireless clients can comprise one or more pay wireless clients and one or more free wireless clients. A pay wireless client pays for the communication service utilized by one or more free wireless client. In an embodiment of the present invention, the plurality of wireless clients are registered with a billing server (BS). The BS coordinates the billing process for the peer-to-peer communication session between the plurality of wireless clients. Also, the BS can provide a list of communication services available for the plurality of wireless clients. The plurality of wireless clients can registers themselves to the BS according to the communication services available, for example the communication service can be a tele-conferencing, a video-conferencing or a text-conferencing. Those skilled in the art will realize that registering each wireless client can comprise authenticating the plurality of wireless clients participating in one more communication services. Upon registration with the BS, each pay wireless client is issued a token corresponding to a peer-to-peer communication session of a communication service. A token corresponding to a communication service comprises details of the communication service and a predefined criterion for each pay wireless client to pay for the communication service utilization by each free wireless client. The predefined criterion can be for example, a predefined amount that a pay wireless client agrees to pay for the communication service. In an embodiment of the invention, a token can be a paid-authentication token that can be issued to each pay wireless client to authorize each pay wireless client to utilize a communication service.

While a peer-to-peer communication session corresponding to a communication service is active, each wireless client participating in the peer-to-peer communication session can simultaneously evaluate the cost of the peer-to-peer communication session and charges pertaining to other communication services such as music file download, used during the peer-to-peer communication session at runtime. At the end of each peer-to-peer communication session, each wireless client forwards the peer-to-peer communication session details to the BS. At step 205, the BS collects a completion-billing-token corresponding to a peer-to-peer communication session from each wireless client involved in the peer-to-peer communication session. In the case when a completion-billing-token from one of the wireless clients is lost, the BS can still calculate an accurate bill based on the existing completion-billing-tokens from other wireless clients participating in the peer-to-peer communication session. The completion-billing-token can comprise a signature or an agreement between a plurality of wireless clients participating in the peer-to-peer communication session. Each wireless client has a unique signature that can comprise the details to be considered during the peer-to-peer communication session.

At step 210, each completion-billing-token is evaluated along with the paid-authentication-token corresponding to the peer-to-peer communication session. As mentioned earlier, the paid-authentication-token can control the duration of a peer-to-peer communication session based on a communication service provider. The billing server checks the consistency across each completion-billing-token received from each wireless client. The BS can create billing information about different communication services regardless of the underlying infrastructure. The BS can further forward the billing information to a wireless client upon demand. Using a paid amount, as stated in the paid-authentication-token for each wireless client, the BS can verify and negotiate data and create billing records for one or more pay wireless clients as a sum of each wireless client using the communication service. In an embodiment of the present invention, if, based on an analysis of the completion-billing-tokens, an update is needed for a completion-billing-token, the BS adjusts the completion-billing-token, negotiates with the wireless clients and sends a correction-paid-token to the wireless clients.

Figure 3:
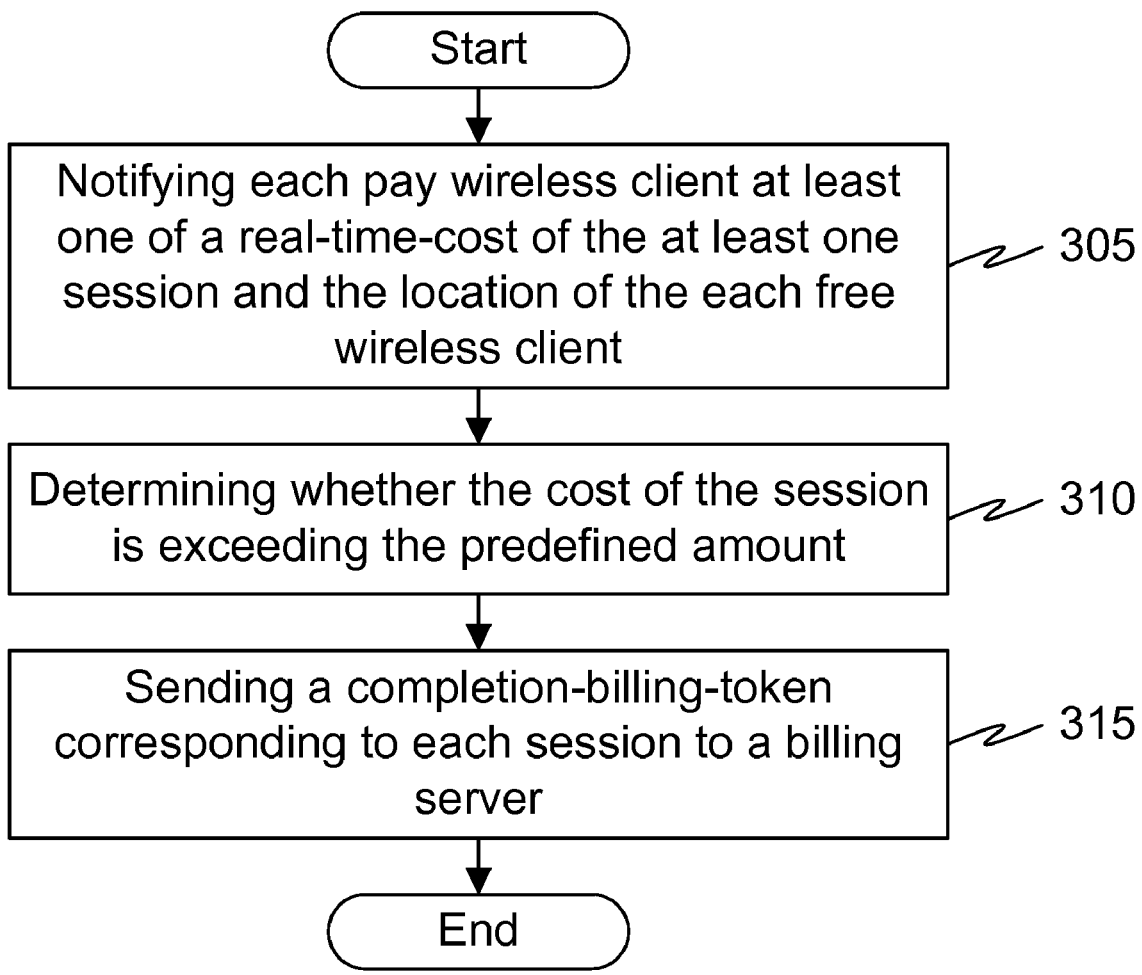
FIG. 3 illustrates a flow diagram of a method of managing at least one peer-to-peer communication session corresponding to at least one communication service in a communication system in accordance with an embodiment of the present invention.

Turning now to FIG. 3, a flow diagram of a method of managing at least one peer-to-peer communication session corresponding to at least one communication service in a communication system is shown in accordance with an embodiment of the present invention. The present embodiment deals with a scenario where a predefined amount is negotiated between a plurality of wireless clients participating in a peer-to-peer communication session. In the present embodiment, one or more pay wireless clients can pay the predefined amount for one or more free wireless clients. In another embodiment, a pay wireless client can set the predefined amount for the overall usage of the communication service, for instance the pay wireless client can set a payment limit to communication services used by the pay wireless client and the free wireless clients. Each pay wireless client receives a token corresponding to the peer-to-peer communication session corresponding to a communication service. A token corresponding to a communication service comprises details of the communication service, a predefined criterion for each pay wireless client to pay for the communication service utilization by each free wireless client. The predefined criterion can be for example, a predefined amount that a pay wireless client agrees to pay for the communication service. To manage the peer-to-peer communication session, each pay wireless client is updated about the session details. At step 305, each pay wireless client can be notified about a real-time-cost of the peer-to-peer communication session and the location of the each free wireless client. The real-time-cost of the peer-to-peer communication session can be calculated by each pay wireless client and each free wireless client and the real-time-cost can be sent to the pay wireless clients. Further, each token corresponding to each communication service can be updated based on a communication service provider, a location corresponding to each pay wireless client and each free wireless client involved in the peer-to-peer communication session, or a service rate corresponding to the communication service.

At step 310, it is determined whether the cost of the peer-to-peer communication session is exceeding the predefined amount. Those skilled in the art will realize that the duration for which the predefined amount lasts may vary depending on, for instance, tariff charged by a wireless client's wireless network, roaming charges in case the wireless client roams out of a home coverage area of the wireless network, and the number of communication services used by the wireless client. At step 315, each wireless client sends a completion-billing-token corresponding to the peer-to-peer communication session to the BS. The completion-billing-token can comprise a signature or an agreement between a plurality of wireless clients participating in the peer-to-peer communication session. Based on the determining step, step 310, at least one of the pay wireless clients can either terminate the peer-to-peer communication session or extend the peer-to-peer communication session. If the peer-to-peer communication session is wished to be extended, any one of the plurality of wireless client, a pay wireless client or a free wireless client, can send the BS a session-extend request. The session-extend request can comprise an amount by which the wireless client wishes to extend the peer-to-peer communication session. Each pay wireless client updates the completion-billing-token based on the session-extend request. Further, each wireless client updates a signature corresponding to the peer-to-peer communication session. The completion-billing-token can inform the BS that the peer-to-peer communication session has been extended. Moreover, in an embodiment of the present invention, the pay wireless client can receive a message from a free wireless client or the BS, if the free wireless client uses a predetermined amount while using the communication service.

In an embodiment of the present invention, a token corresponding to each communication service is shared with the free wireless clients. A token can comprise details of the communication service and a predefined criterion for at least one pay wireless client to pay for the communication service utilized by the free wireless clients.

In an embodiment of the invention, one or more free wireless clients can send an unused-authorization-credit-token to each pay wireless clients. The unused-authorization-credit-token enables each pay wireless clients to calculate an actual amount used from the predefined amount. Each pay wireless client can then sends a return-token to the BS. Based on the return-token and the completion-billing-tokens received from each pay wireless client, the BS calculates a final cost for the peer-to-peer communication session.

Figure 4:
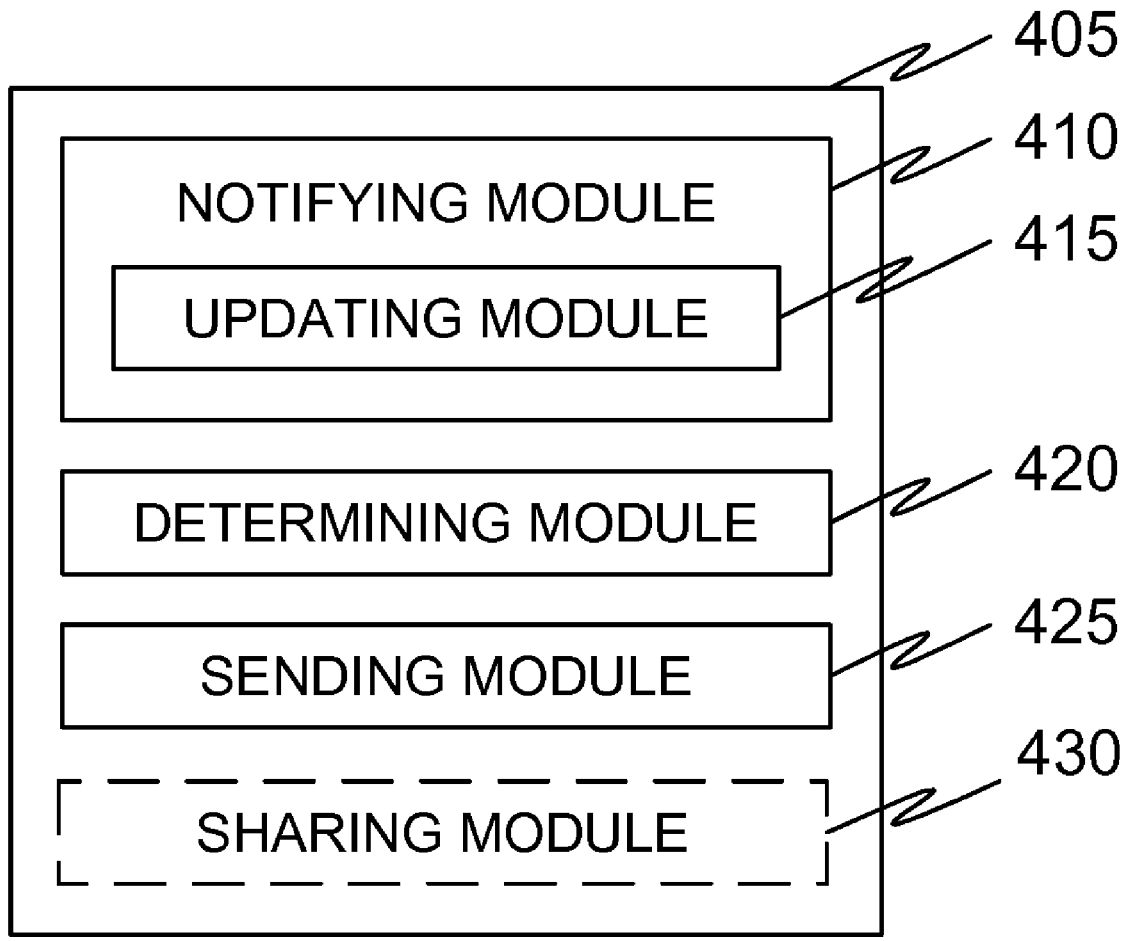
FIG. 4 illustrates a block diagram of a system for managing at least one peer-to-peer communication session corresponding to at least one communication service in a communication system in accordance with an embodiment of the present invention.

Turning now to FIG. 4, a block diagram of a system 405 for managing at least one peer-to-peer communication session corresponding to at least one communication service in a communication system is shown in accordance with an embodiment of the present invention. The system 405 can allow one or more pay wireless clients to pay a predefined amount for one or more free wireless clients for a communication service. The system 405 can reside on a wireless client. The wireless client can be a pay wireless client or a free wireless client. The system 405 comprises a notifying module 410. The notifying module 410 can notify each pay wireless client a real-time-cost of the at least one peer-to-peer communication session and the location of each free wireless client. The real-time-cost of each peer-to-peer communication session can be calculated by each pay wireless client and each free wireless client and the pay wireless clients and the free wireless clients can send the real-time-cost to a billing server (BS) and the other wireless clients.

The notifying module 410 can further comprise an updating module 415. The updating module 415 can be adapted for updating each token corresponding to each communication service based on a communication service provider, a location corresponding to each pay wireless client and each free wireless client involved in the peer-to-peer communication session and a service rate corresponding to the communication service.

Each pay wireless client receives a token corresponding to a peer-to-peer communication session corresponding to a communication service. A token corresponding to the communication service comprises details of the communication service, a predefined criterion for each pay wireless client to pay for the communication service utilization by each free wireless client. The system 405 can comprise a determining module 420. The determining module 420 can use the information in the paid-authentication-token to determine whether the cost of the peer-to-peer communication session is exceeding the predefined amount agreed on by the pay wireless client. The peer-to-peer communication session duration can be controlled based on the cost of the peer-to-peer communication session and the predefined amount. In an embodiment of the present invention, a free wireless client can control the predefined amount paid by the pay wireless client. The free wireless client can use various algorithms for controlling the predefined amount, for example the free wireless client can use algorithms such as proportion spending, equal usage or sequence usage.

The peer-to-peer communication session can be extended or terminated if the predefined amount is exceeded. If the predefined amount is to be extended, a renewed paid-authentication-token is sent to the pay wireless client. This renewed paid-authentication-token can comprise a new predefined amount that can be used by the wireless clients.

The system 405 can further comprise a sending module 425. The sending module 425 sends a completion-billing-token corresponding to each peer-to-peer communication session to the BS. In the case when a completion-billing-token from the sending module 425 is lost, the BS can still calculate an accurate bill based on the existing completion-billing-tokens from other sending modules in the peer-to-peer communication session. The completion-billing-token can comprise details, such as a signature or an agreement of the pay wireless clients, corresponding to the peer-to-peer communication session.

In an embodiment of the present invention, the system 405 can further comprise a sharing module 430. The sharing module 430 shares the token corresponding to the communication service with the at least one free wireless client. Those skilled in the art will realize that the sharing module 430 can also share more than one token corresponding to each of the various communication services used in the peer-to-peer communication session. As mentioned earlier, each token comprises details of the communication service and the predefined criterion for one or more wireless client to pay for the communication service utilization by one or more free wireless client.

Figure 5:
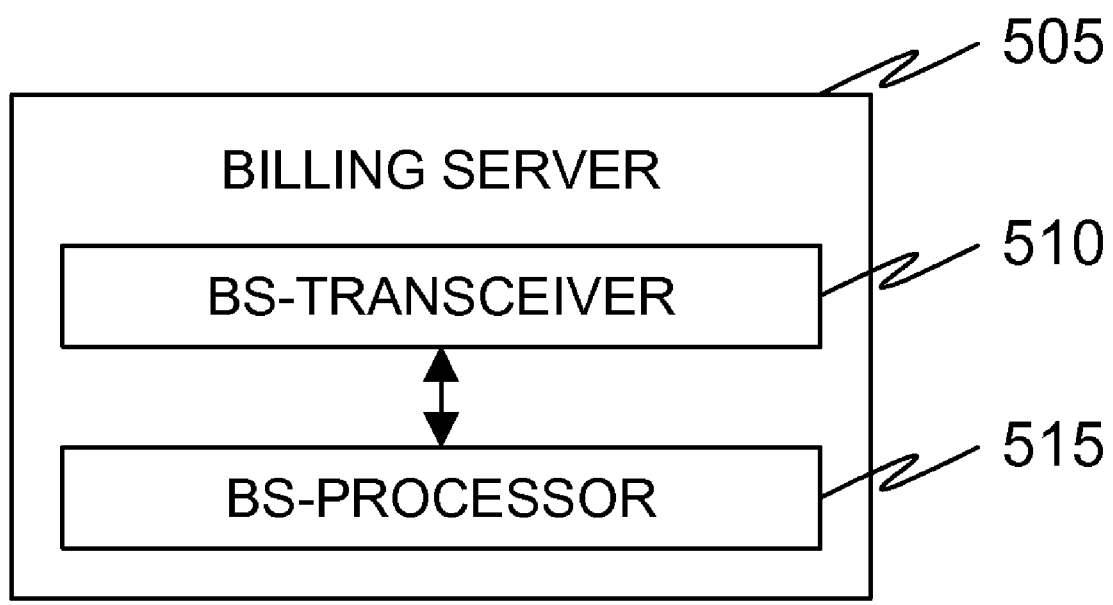
FIG. 5 illustrates a block diagram of a billing server (BS) for generating peer-to-peer billing records in accordance with an embodiment of the present invention.

Turning now to FIG. 5, a block diagram of a billing server (BS) 505 for generating peer-to-peer billing records is shown in accordance with an embodiment of the present invention.

The BS 505 comprises a BS-transceiver 510. The BS-transceiver 510 enables the BS 505 to communicate with a plurality of wireless clients. The BS-transceiver 510 can be configured to collect a completion-billing-token corresponding to a peer-to-peer communication session corresponding to a communication service from one or more pay wireless client. A pay wireless client pays for one or more free wireless clients involved in a peer-to-peer communication session. Each pay wireless client and each free wireless client involved in the peer-to-peer communication session corresponding to the communication service can send the completion-billing token to the BS 505. However, those skilled in the art will realize that a wireless client may, at times, not be able to send a completion-billing-token to the BS, for example if the wireless client loses power or is damaged or malfunctions. The BS-transceiver 510 can also be configured to send a paid-authentication-token corresponding to each pay wireless client. The paid-authentication-token can control the duration of a peer-to-peer communication session based on a communication service provider. The BS-transceiver 510 can also send correction-paid-token to each pay wireless client. The BS-transceiver 510 can be in communication with more than one pay wireless clients simultaneously.

The BS 505 further comprises a BS-processor 515 adaptively coupled with the BS-transceiver 510. The BS-processor 515 is configured for evaluating the completion-billing-token along with the paid-authentication-token corresponding to the peer-to-peer communication session and with a signature for the free wireless clients. The BS-processor 515 can further be configured for registering each pay wireless client and each free wireless client. The BS 505 can provide a list of communication services available for the wireless clients. The BS-processor 515 can also issue a token corresponding to a peer-to-peer communication session to each pay wireless client. The token can comprise details of the communication service, a predefined criterion for each pay wireless client to pay for the communication service utilization by one or more free wireless clients.

The BS-processor 515 calculates an accurate bill for the peer-to-peer communication session using the completion-billing-tokens received from each pay wireless client and each free wireless client. As mentioned earlier, in the case when a completion-billing-token from one of the wireless clients is received, the BS-processor 515 can still calculate an accurate bill based on the existing completion-billing-tokens from other wireless clients participating in the peer-to-peer communication session. In an embodiment of the present invention, where there are more than one pay wireless clients, the BS-processor 515 splits the bill for the peer-to-peer communication session between each pay wireless client according to the agreement in the completion-billing-tokens and the paid-authorization-token.

In case a pay wireless client pays a predefined amount for the peer-to-peer communication session, the BS-processor 515 is also configured for controlling a duration for which the peer-to-peer communication session remains active depending on, for instance, whether a wireless client is roaming or a wireless client is using multiple communication services simultaneously. The BS 505 can get a notification from a wireless client when it moves from one wireless network to another. The BS-processor 515 can then calculate the bill for the communication service. The BS 505 can suspend one or more of the communication services from the multiple communication service used by a wireless client to guarantee completion of the other communication services.

In an embodiment of the invention, a free wireless client can send an unused-authorization-credit-token to the pay wireless client. The unused-authorization-credit-token enables the pay wireless clients to calculate an actual amount used the predefined amount. The pay wireless client can then send a return-token to the BS 505. Based on the return-tokens and the completion-billing-tokens received from the each wireless client, the BS-processor 515 calculates a final cost for the peer-to-peer communication session.

The various embodiments of the invention provide a method and system for generating peer-to-peer billing records for a peer-to-peer communication session corresponding to a communication service wherein one or more pay wireless clients pay for the service utilization by one or more free wireless clients. Further, the various embodiments of invention provide a method and system that manages the peer-to-peer communication session by calculating a real-time cost of the peer-to-peer communication session and other services utilized by each wireless client. Also, by the virtue of the present invention, a call processing server is not needed to collect information from the wireless clients to calculate a bill. The wireless clients can communicate with each other to obtain information about the peer-to-peer communication session and can forward the information in the form of completion-billing-tokens to the BS. The BS, then, calculates an accurate bill for the peer-to-peer communication session and sends the bill to the wireless clients.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The inventions defined solely by the appended claims including any amendments made during the pendency of this application and all equivalents of those claims as issued.

What is claimed is:

1. A method of managing at least one peer-to-peer communication session corresponding to at least one communication service in a communication system, wherein at least one pay wireless client pays a predefined amount for at least one free wireless client, the method comprising the steps of:
   notifying each pay wireless client at least one of a real-time-cost of the at least one peer-to-peer communication session and the location of the each free wireless client, wherein each pay wireless client and each free wireless client calculate the real-time-cost of each peer-to-peer communication session;
   determining whether the cost of the peer-to-peer communication session is exceeding the predefined amount; and
   sending a completion-billing-token corresponding to each peer-to-peer communication session to a billing server, wherein the completion-billing-token comprises the details corresponding to the peer-to-peer communication session, the details being at least one of a signature and an agreement.

2. The method of claim 1 further comprising the step of:
   sharing at least one token corresponding to the at least one communication service with the at least one free wireless client, wherein each token corresponding to each communication service comprises details of the communication service, a predefined criterion for the at least one pay wireless client to pay for the communication service utilized by the at least one free wireless client.

3. The method of claim 1, wherein the notifying step comprises updating each token corresponding to each communication service based on at least one of a communication service provider, a location corresponding to each pay wireless client and each free wireless client involved in the peer-to-peer communication session and a service rate corresponding to the communication service.

4. The method of claim 1, wherein based on the determining step the at least one pay wireless client performs at least one of the action of terminating the peer-to-peer communication session and extending the peer-to-peer communication session.

5. The method of claim 4, wherein for extending the peer-to-peer communication session the at least one pay wireless client updates the completion-billing-token based on a session-extend request.

6. The method of claim 5, wherein the at least one free wireless client issues the session-extend request.

7. The method of claim 5, wherein the at least one pay wireless client issues the session-extend request.

8. A system for managing at least one peer-to-peer communication session corresponding to at least one communication service in a communication system, wherein at least one pay wireless client pays a predefined amount for at least one free wireless client, the system comprising:
   a notifying module, the notifying module notifies each pay wireless client at least one of a real-time-cost of the at least one peer-to-peer communication session and the location of the each free wireless client, wherein each pay wireless client and each free wireless client calculate the real-time-cost of each peer-to-peer communication session;
   a determining module, the determining module determines whether the cost of the peer-to-peer communication session is exceeding the predefined amount; and
   a sending module, the sending module sends a completion-billing-token corresponding to each peer-to-peer communication session to a billing server, wherein the completion-billing-token comprises the details corresponding to the peer-to-peer communication session, the details being at least one of a signature and an agreement.

9. The system of claim 8 further comprising:
   a sharing module, the sharing module shares at least one token corresponding to the at least one communication service with the at least one free wireless client, wherein each token corresponding to each communication service comprises details of the communication service, a predefined criterion for the at least one wireless client to pay for the communication service utilization by the at least one free wireless client.

10. The system of claim 8, wherein the notifying module comprises:
    an updating module, the updating module updates each token corresponding to each communication service based on at least one of a communication service provider, a location corresponding to each pay wireless client and each free wireless client involved in the peer-to-peer communication session and a service rate corresponding to the communication service.

* * * * *